United States Patent [19]
Tsutumi

[11] Patent Number: 5,887,811
[45] Date of Patent: *Mar. 30, 1999

[54] FISHING REEL

[75] Inventor: Wataru Tsutumi, Tokyo, Japan

[73] Assignee: Daiwa Seiko, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 602,151

[22] Filed: Feb. 15, 1996

[30] Foreign Application Priority Data

Feb. 16, 1995 [JP] Japan .................................... 7-028172

[51] Int. Cl.⁶ ........................................................ G09F 9/00
[52] U.S. Cl. ................. 242/322; 242/118.72; 242/118.4; 242/613; 116/299
[58] Field of Search ................................ 242/322, 160.4, 242/160.1, 899, 613, 118.32, 118.4, 118.7; 116/299, 302, 200, 1

[56] References Cited

U.S. PATENT DOCUMENTS

| | | | |
|---|---|---|---|
| 459,511 | 9/1891 | Loomis | 242/322 |
| 839,439 | 12/1906 | Underdown | 242/160.4 |
| 2,484,090 | 10/1949 | Hedfield | 242/118.4 |
| 3,533,372 | 10/1970 | Rosenvold | 116/299 |
| 4,262,857 | 4/1981 | Gilbert | 242/322 X |
| 4,901,663 | 2/1990 | De Luca | 242/160.1 X |
| 5,497,954 | 3/1996 | Johansson | 242/322 |

FOREIGN PATENT DOCUMENTS

| | | | |
|---|---|---|---|
| 726864 | 2/1966 | Canada | 116/299 |
| 49-57489 | 9/1947 | Japan . | |
| 306345 | 2/1929 | United Kingdom | 242/118.32 |
| 310192 | 4/1929 | United Kingdom | 242/118.32 |

Primary Examiner—Donald P. Walsh
Assistant Examiner—Emmanuel M. Marcelo
Attorney, Agent, or Firm—Sughrue, Mion, Zinn, Macpeak & Seas, PLLC

[57] ABSTRACT

In a fishing reel, on the surface of a fishline winding barrel portion (10a) of a spool (10) around which a fishline (5) is wound in accordance with the rotational movement of a handle 7, a display portion (10b) is provided which can be visually recognized through the fishline wound around the winding barrel portion of the spool. As a result, a reel user is able to visually recognize with ease the quantity of fishline wound around the spool and the amount of fishline that has been played out.

20 Claims, 8 Drawing Sheets

FISHING REEL

BACKGROUND OF THE INVENTION

The present invention relates to a fishing reel.

In using a fishing reel, for example, as disclosed in Japanese Utility Model Publication No. 49-57489 of Showa, a technique is known for recognizing the quantities of play-out of a fishline wound around a spool. The technique disclosed in this publication is illustrated in FIG. 13 and relates to a spinning reel in which, on at least one of mutually opposing inner surfaces 31, 32 of a fishline winding portion of a spool, 30 there are provided a plurality of scale portions 34 which extend from the neighborhood of the barrel portion 36 of the spool to the outer peripheral portion 38 of the spool and have different scale distances. As the fishline is played out, a user of the spinning reel sees the displays of the scale portions 34 becoming visible successively, to thereby be able to recognize the quantity of play-out of the fishline at the current time.

However, according to the above-mentioned structure, when the scale portions 34 are provided on the inner surface 31 of the spool 30 on the reel main body side, the reel user has to move around to the rod top side to view the scale portions. Alternatively, when the scale portions 34 are provided on the inner surface 32 of the spool 30 on the rod top side, the reel user has to view the scale portions over a reel leg portion or a handle. That is, either location for the scale portions 34 results in poor visibility of the scale portions and is cumbersome to use as a practical matter.

Also, the inner surface of the spool on the rod top side provides a small angle with respect to the horizontal surface and the depth of a groove formed in the spool is also shallow. In the case of a long throw spool, which is referred to as a shallow groove spool, the scale distances become smaller, which makes it difficult to see the scales clearly.

SUMMARY OF THE INVENTION

In view of the above-mentioned conventional circumstances, it is an object of the present invention to provide a fishing reel including a display portion which allows a reel user to visually recognize with ease the quantities of play-out of a fishline wound around a spool.

In solving the above problems, according to the invention, there is provided a fishing reel characterized in that, on the surface of a fishline winding barrel portion of a spool around which a fishline is wound as a handle is rotated, there is provided a display portion which can be visually recognized through the fishline that is wound on the spool.

According to the invention, the display portion is provided on the easy-to-see surface of the fishline winding barrel portion of the spool around which the fishline is wound. This display portion can be easily seen through the fishline wound. Also, this display portion can be visually recognized in a gradually clearer manner as the fishline is played out and the quantity of the wound fishline becomes smaller. This allows the reel user to recognize the quantity of play-out of the fishline in accordance with the current appearance of the display portion. Especially, if the display portion is given numeral values which can be visually recognized concretely according to the quantities of winding of the fishline, then the quantity of play-out of the fishline can be visually recognized with more ease.

DETAILED DESCRIPTION OF THE PREFERRED EMBODIMENTS

Now, a detailed description will be given below of the preferred embodiments of a fishing reel according to the invention with reference to the accompanying drawings.

Figure 1:
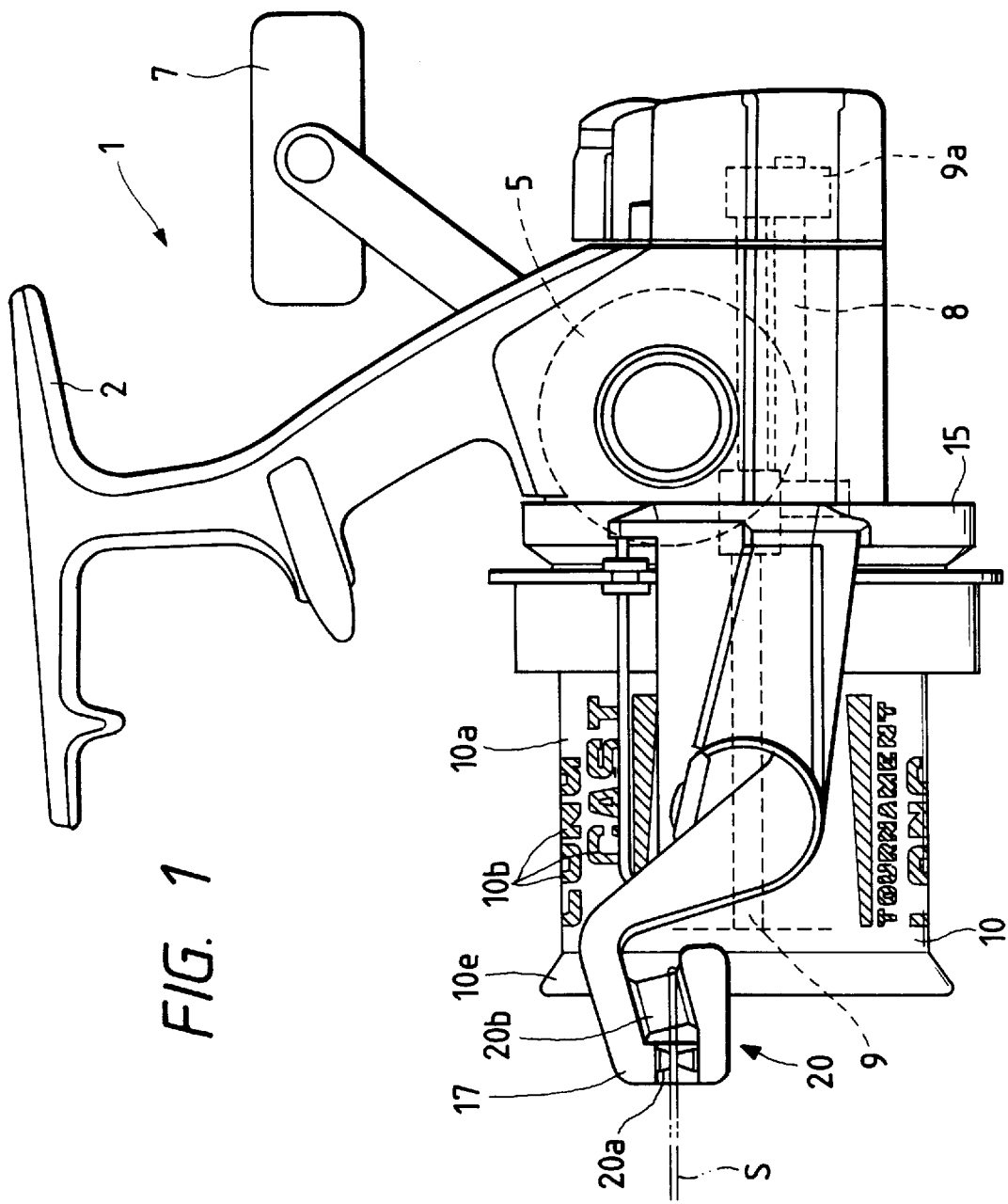
FIG. 1 is a front view of an embodiment of the structure of a fishing reel according to the invention.

FIG. 1 is a front view of an embodiment of a structure of a spinning reel according to the invention. Spinning reels are one of several types of commercially available fishing reels. A reel main body 1 is mounted on a fishing rod (not shown) by a fishing rod mounting portion 2. The reel main body 1 includes a handle 7. A drive gear 5 is mounted in the interior portion of the body 1, while a worm shaft 8 meshes with the drive gear 5. A slider 9a is engaged with the worm shaft 8, and is mounted on the base end portion of a spool shaft 9. A spool 10 is mounted on the leading end side of the spool shaft 9. By operating or rotating the handle 7, the spool 10 slides back and forth by means of the drive gear 5, worm shaft 8 and slider 9a. Also, in the reel main body 1, there is provided a rotor 15 which is rotationally driven via the drive gear 5.

A bail (not shown) is attached to the rotor 15 through a pair of arm levers 17 (only one of them is shown). The illustrated arm level 17 includes a fishline guide portion 20 on the leading end side thereof. The bail can be switched over to a fishline take-up position or a fishline play-out position. In a condition in which the bail is set to the fishline take-up position, if the handle 7 is rotationally driven, then the spool 10 moves back and forth and, at the same time, the rotor 15 including the fishline guide portion 20 is rotationally driven, so that the fishline S can be wound uniformly around the fishline winding barrel portion 10a of the spool 10.

On the surface of the fishline winding barrel portion 10a, there is provided by printing, or by painting a display portion 10b. This display portion 10b can be visually recognized through the fishline that is wound uniformly around the fishline winding barrel portion 10a of the spool 10. This structure is based on the premise that the fishline to be wound consists of a transparent line formed of nylon or the like, so that the display portion 10a can be recognized visually through the transparent fishline. However, the color of the line is not limited to any specific color.

Examples of methods for printing the display portion on the surface of the fishline winding barrel portion 10a of the spool 10 include a pat printing method, a screen printing method, a hot stamping method (a thermal transfer method), an ink jet method, a double alumite method, or the like. In painting, preferably, urethane paint may be used or coarse particles may be mixed into the paint before painting. With use of such painting methods, the coefficient of friction of the surface of the fishline winding barrel portion 10a can be increased, so that shifting of the fishline or the like in the early stage of the fishline winding operation can be prevented.

As described above, the display portion 10b on the fishline winding barrel portion 10a of the spool 10 is situated at a position that can be seen with ease from every viewing position. Accordingly, the reel user is able to visually recognize the display portion 10b through the transparent fishline wound around the fishline winding barrel portion 10a of the spool 10. In this case, when the quantity of fishline wound on the spool is large, the display portion 10b cannot be visually recognized clearly. However, as the fishline is played out, the display portion 10b can be visually recognized gradually. Therefore, the quantity of the fishline played out can be determined to a certain degree in accordance with the way in which the display portion 10b of the spool 10 appears at that moment. Also, since the display portion 10b of the spool 10 is preferably relatively large, i.e., unlike a small type of display such as a scale or the like, the display portion 10b is easily and readily visually recognized.

Figure 2:
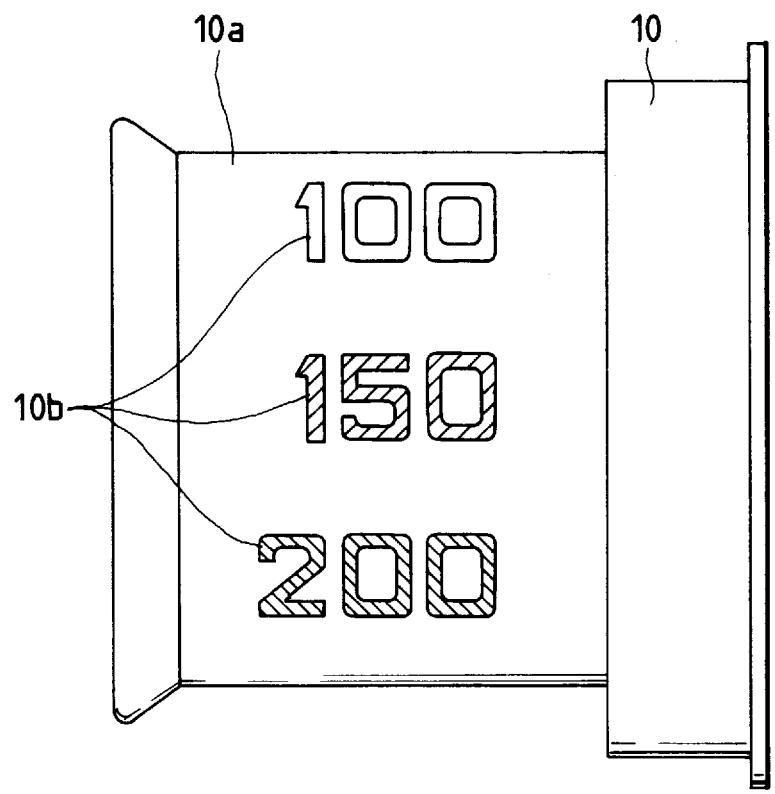
FIG. 2 is a view of a modification of a display portion provided in a spool of the fishing reel shown in FIG. 1.

FIG. 2 shows a more preferred embodiment of the display portion 10b to be provided on the surface of the fishline winding barrel portion 10a of the spool 10. This display portion 10a of the spool 10 is produced by shaded numerals in such a manner that they can be visually recognized, respectively, in correspondence to the extent the fishline is wound on the spool. Specifically, when a fishline having a maximum length of 200 m can be wound around the spool 10, a display portion 200 is printed (or painted) most deeply and discernably, while display portions 150 and 100 are respectively printed (or painted) gradually lighter. A description of the visual recognition when shaded display portions are provided in this manner will now be presented with reference to FIGS. 3 to 6.

Figure 3:
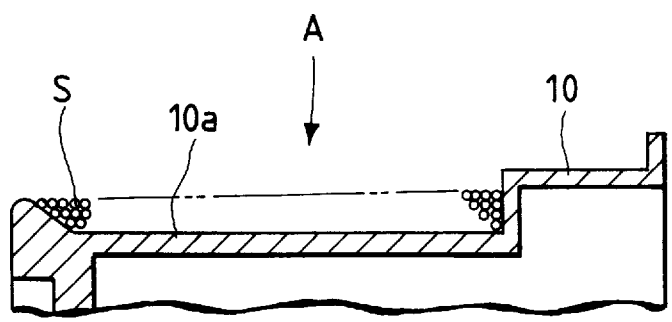
FIG. 3 is a section view of a part of the spool shown in FIG. 2.
Figure 4:
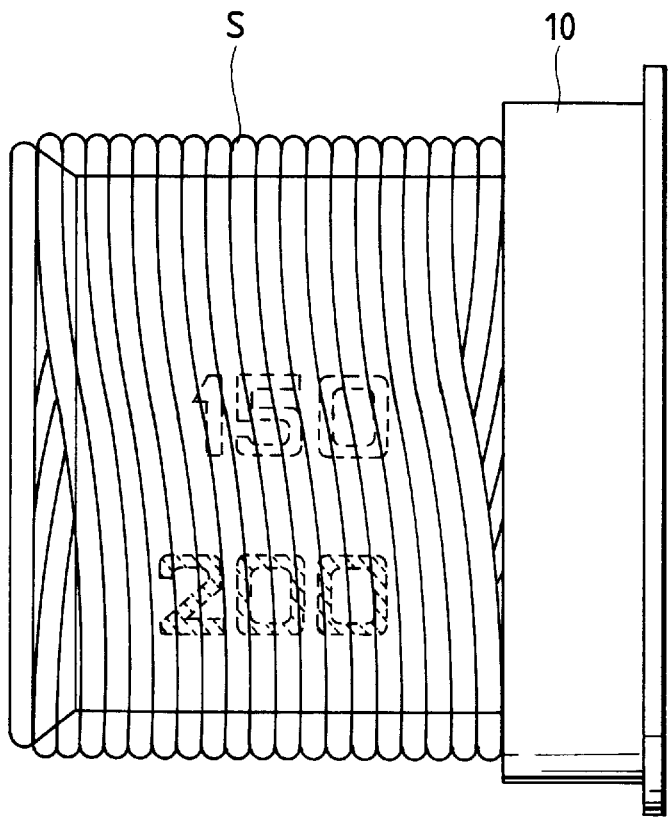
FIG. 4 is a view of the spool shown in FIG. 3, when viewed from a direction of an arrow A in FIG. 3.
Figure 5:
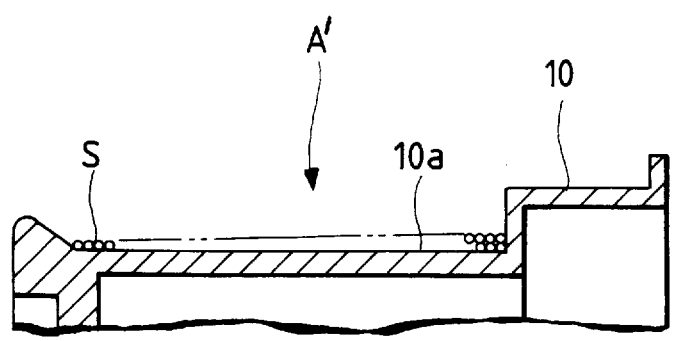
FIG. 5 is a section view of a part of the spool shown in FIG. 2, showing a state in which a fishline is played out to a certain degree from the state shown in FIG. 3.
Figure 6:
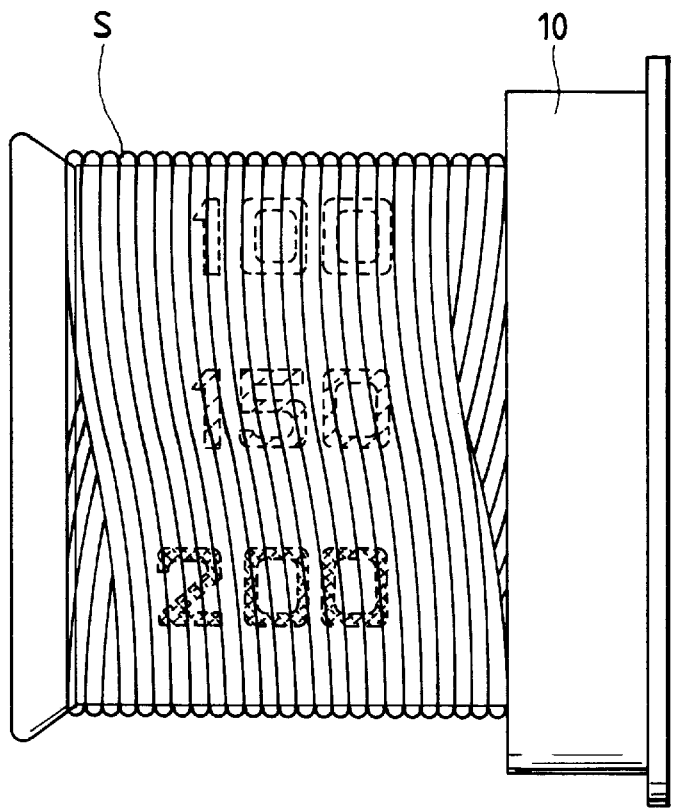
FIG. 6 is a view of the spool shown in FIG. 5, when viewed from a direction of an arrow A' in FIG. 5.

It is assumed that, as shown in FIG. 3, a considerable quantity of fishline is wound around the fishline winding barrel portion 10a of the spool 10. In this state, when viewed from a direction of an arrow A, as shown in FIG. 4, the display portion 200 is visually recognized clearly, while the display portion 150 can be visually recognized only slightly. Due to this circumstance, it is possible to recognize that the current amount of fishline wound on the spool is in the range of 170–180 m (i.e., the current quantity of play-out of the fishline is in the range of 20–30 m). By the same token, as shown in FIG. 5, in a state in which the fishline is played out to a greater degree, when viewed from a direction of an arrow A', as shown in FIG. 6, the display portions 200 and 150 can be visually recognized clearly, while the display portion 100 can be visually recognized only slightly. This makes it possible to recognize that the current quantity of wound fishline is in the range of 120–130 m (i.e., the current quantity of fishline played out is in the range of 70–80 m).

As described above, there are provided shaded display portions in correspondence to the extent of winding of the fishline. As a result, it is possible to recognize the extent to which the fishline is played out with a certain degree of accuracy. This facilitates confirming that an intended fishing point has in fact been struck, and, therefore, a larger catch can be expected. However, the shaded display portions shown in the present embodiment are only typical, representative ones and other kinds of display portions are also possible. For example, the display portion numerals may be changed in such a manner that they display the current quantities of play-out of the fishline, or the display portions may be arranged side by side in the axial direction. Further, the display portion 10b may be structured by means other than numerals, e.g., the display portion 10b may be color coded. Thus, e.g., on manner of embodying numerals 100, 150 and 200 in FIG. 2 is through the use of respectively different colors for each numeral.

Figure 7:
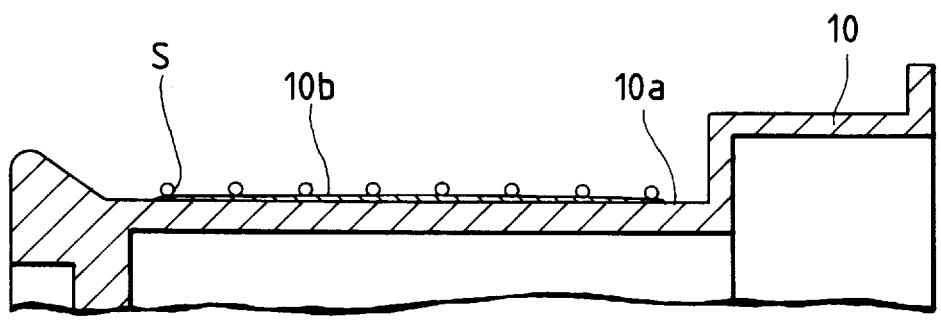
FIG. 7 is a section view of a part of the spool shown in FIGS. 1 and 2, showing a state in which a display portion having a large frictional resistance is provided.

As described above, by providing the display portion 10b having a large frictional resistance in the fishline winding barrel portion 10a of the spool 10, as shown in FIG. 7, it is possible to prevent the fishline from shifting in the axial direction in the early stage of the fishline winding operation. This results in the ability to wind the fishline smoothly. Also, this eliminates the need for a separate slide preventive feature such as the provision of a groove in the surface of the fishline winding barrel portion of the spool, which in turn prevents the fishline from biting into such groove during the fishline winding operation. This biting prevention in turn can reduce the play-out resistance of the fishline when the fishline is played out.

Figure 8:
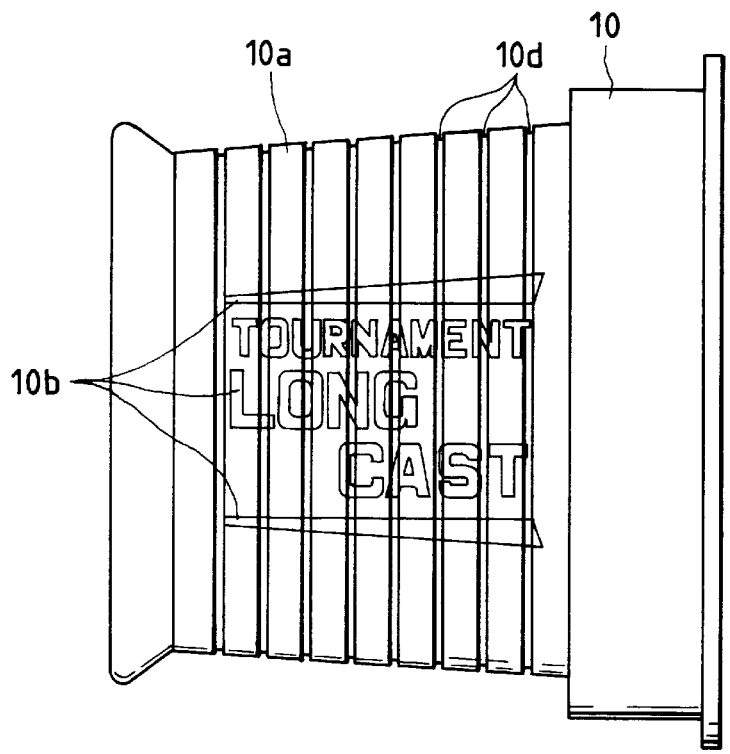
FIG. 8 is a view of another modification of the spool portion of the fishing reel shown in FIG. 1.

The invention is not limited to any specific shapes of spools nor to any specific kinds of reels, so the invention can be applied to various types of spools and reels. For example, in the spool of a long throw spinning reel, as shown in FIG. 8, the spool is normally structured such that it is tapered toward the rod top side in order to be able to play out the fishline easily. Similarly to the above-mentioned embodiment, the display portion 10b can be provided on the surface of the fishline winding barrel portion 10a of the spool 10 that is tapered in this manner. In the embodiment shown in FIG. 8, a large number of slide preventive grooves 10d are formed in the surface of the fishline winding barrel portion 10a of the spool 10 in order to prevent the fishline from moving forward along such taper in the early stage of the fishline winding operation. Of course, this is not limitative, since these grooves 10d can be omitted according to the situation given. As mentioned before, a display portion having a large frictional resistance may be provided. As yet another alternative, a display portion having a large frictional resistance may be provided in addition to the grooves 10d. As a general proposition, the best method of producing the display portion out of the above-mentioned printing and painting methods is selected based on the conditions of the surface of the fishline winding barrel portion 10a of the spool 10.

Figure 9:
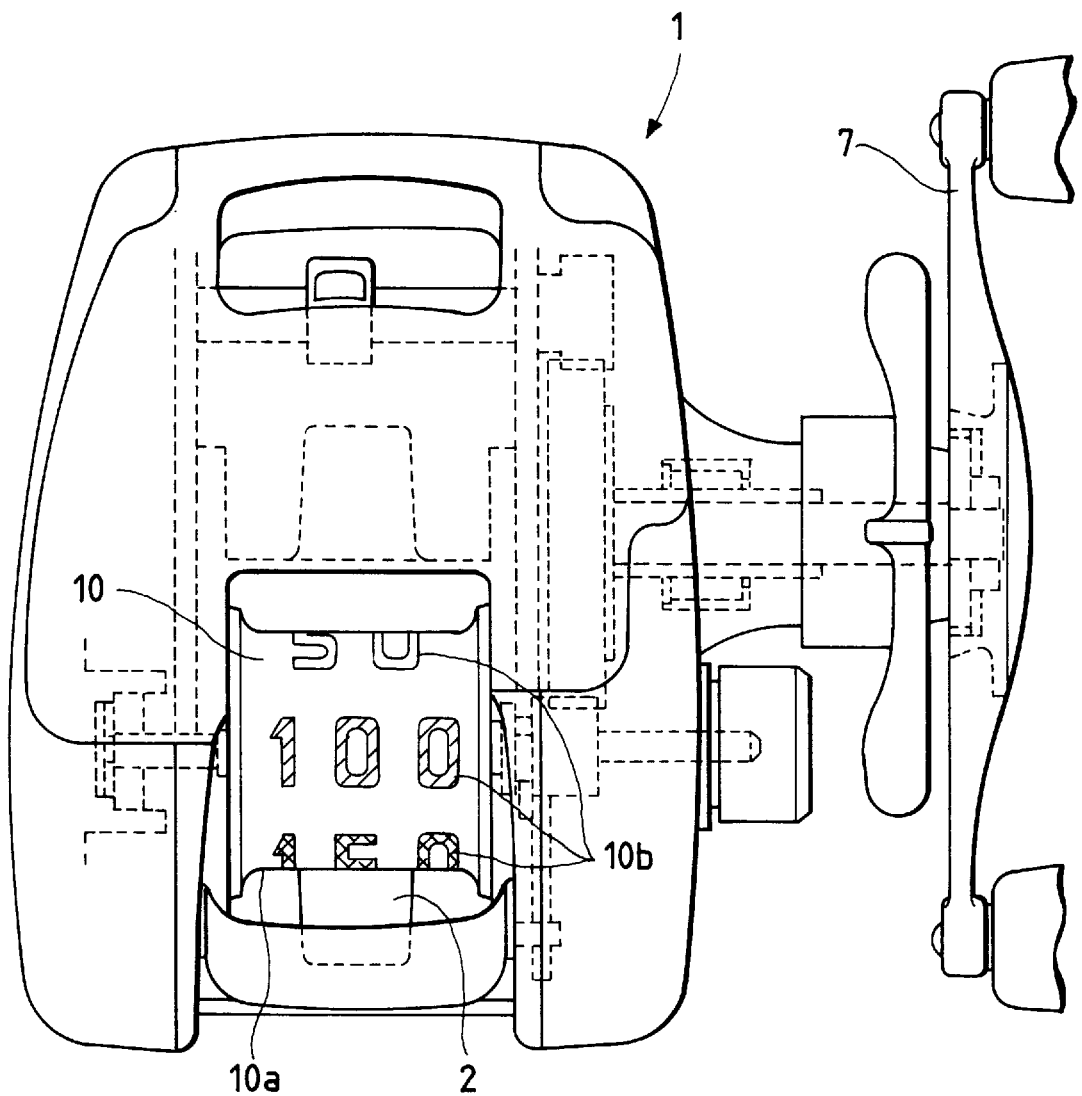
FIG. 9 is a view of another embodiment of the structure of a fishing reel according to the invention.
Figure 11:
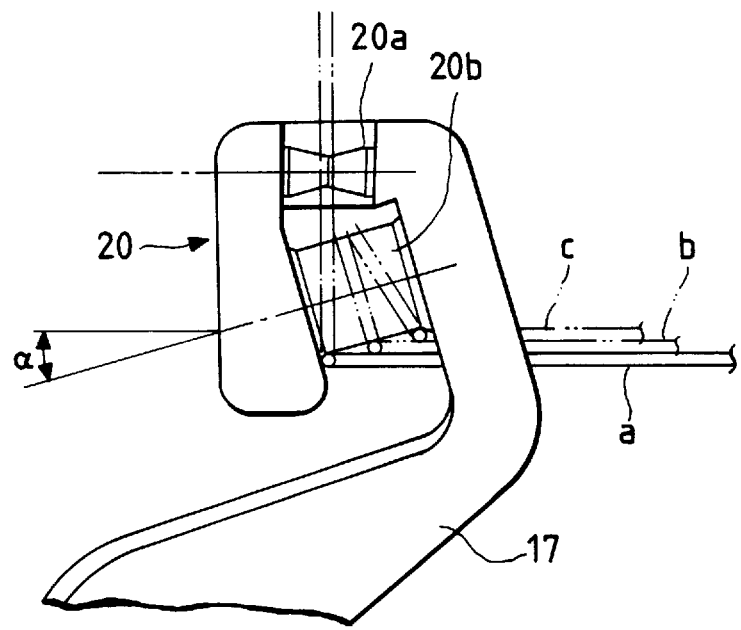
FIG. 11 is an enlarged view of a fishline guide portion of the fishing reel shown in FIG. 1.

FIG. 9 shows another embodiment of the structure of a fishing reel according to the invention. In this embodiment, a plurality of shaded display portions are provided on the surface of the fishline winding barrel portion 10a of a spool 10 of a double bearing type reel. Although the detailed description of the main body of the double bearing type is omitted, the invention can also be applied to such type of reel.

Figure 10:
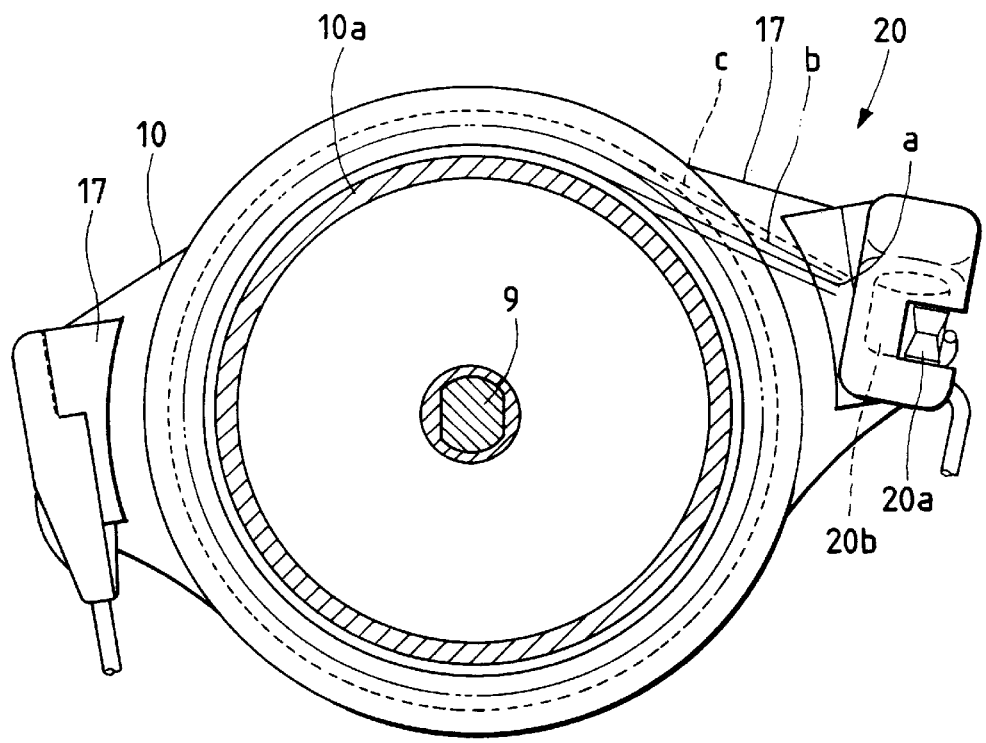
FIG. 10 is a view of the fishing reel shown in FIG. 1, when viewed from the rod top side.
Figure 12:
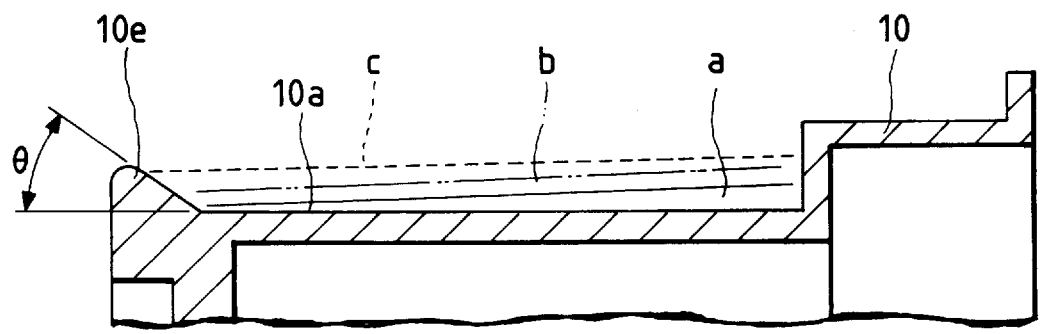
FIG. 12 is a view of a state in which the fishline is wound around the spool of the fishing reel shown in FIG. 1.
Figure 13:
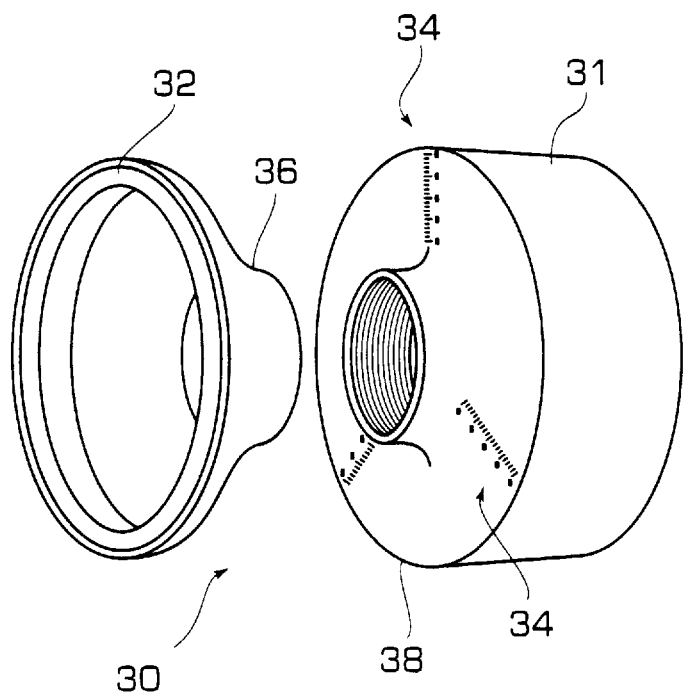
FIG. 13 is a perspective view of a conventional fishing reel spool, provided with scale portions.

Referring back again to FIG. 1, the spinning reel shown in FIG. 1 is a reel of a long throw type. In order to make it easy to play out the fishline wound around the spool 10, an angle of inclination 6 of a front flange 10e of the spool with respect to the horizontal surface is formed small (see FIG. 12). However, due to this, during the fishline winding operation, the fishline is easily slides down forwardly, which provides a resistance when the fishline is played out because the fishline windings catch on one another. To eliminate this drawback, in the spinning reel according to the present embodiment, the fishline guide portion 20 is structured in the following manner:

As shown in FIG. 10, as the fishline is wound gradually around the fishline winding barrel portion 10a of the spool 10, the locus of the fishline varies in the order of a, b, and c. That is, in the state a in which the quantity of winding of the fishline is small and in the state c in which the quantity of winding of the fishline is large, there exists a certain degree of angle (which is expressed as $\alpha$). In order to correspond to this angle, the fishline guide portion 20 includes a line roller 20a, which is small in resistance and is used to control line passage, and a line roller 20b which is inclined at the angle $\alpha$ with respect to the line roller 20a. Due to this structure, as the quantity of winding of the fishline increases, the position of the fishline passing on the line roller 20b varies in the order of a, b and c. And, as shown in FIG. 12, when the winding quantity is small, the fishline is wound more in the rear portion of the spool and, as the winding quantity increases, the line winding position varies or moves forward gradually. In a state in which the fishline is wound completely around the fishline winding barrel portion 10a of the spool 10, the fishline is a condition as shown by c, so that the fishline can be wound smoothly without falling down in the portion of the front flange 10e. As a result of this, the fishline can be played out easily without resistance.

As has been described heretofore, according to the invention, a display portion is provided on the surface of a fishline winding barrel portion of a spool. As a result, the display portion can be discerned visually through the fishline wound around the winding barrel portion of the spool. It is therefore easy for a reel user to see the display portion from every angle or position. Also, the quantities of play-out of the fishline can be visually recognized with ease according to the current appearance of the display portion on the surface of the fishline winding barrel portion of the spool.

What is claimed is:

1. A fishing reel for winding a fishline around a spool in accordance with the rotational movement of a handle, wherein, a display portion is provided on a surface of a fishline winding barrel portion of said spool around which said fishline is wound, (i) said display portion comprising a layer applied onto said surface of said fishline winding barrel portion around which said fishline is wound, (ii) said display portion being visible through at least a predetermined amount of said fishline wound around said surface of said fishline winding barrel portion, and (iii) said display portion contrasting visibly with said surface of said fishline winding barrel portion.

2. A fishing reel as set forth in claim 1, wherein said display portion has a plurality of shaded portions, each said shaded portion being shaded differently than other said shaded portions in such a manner that each said shaded portion is visible through at most an associated amount of said fishline wound on said spool, each of the associated amounts differing from the other associated amounts associated with said other shaded portions.

3. A fishing reel as set forth in claim 1, wherein said display portion becomes visible through said fishline wound on said spool when a predetermined amount of said fishline is played out from said spool.

4. A fishing reel as set forth in claim 1, wherein said display portion is indicative of an amount of said fishline played out from said spool.

5. A fishing reel according to claim 1, wherein said display portion is provided in at least an axially central location on said surface of said fishline winding barrel portion.

6. A fishing reel according to claim 5, wherein said display portion is provided exclusively on said surface of said fishline winding barrel portion.

7. A fishing reel according to claim 5, wherein said display portion covers at least half of said surface of said fishline winding barrel portion axially.

8. A fishing reel according to claim 5, wherein:
   said surface of said barrel portion forms a circumferential periphery of said fishline winding barrel portion; and
   said display portion covers at least a quarter of said surface of said fishline winding barrel portion circumferentially.

9. A fishing reel comprising:
   a reel body;
   a spool connected to said reel body;
   a translucent fishline; and
   a rotor connected to said reel body for winding said fishline around said spool; wherein:
      said spool comprises a front flange portion and a barrel portion, said barrel portion having an outer surface which extends from said front flange portion toward said reel body and around which said fishline is wound;
   a display portion is provided on the outer surface of said barrel portion and covers at least a substantial portion of the outer surface of said barrel portion;
   said display portion exhibits at least two gradations of visibility in at least two respective areas of said display portion, such that:
      a first of said respective areas is visible through at most a first amount of said fishline wound on said spool,
      a second of said respective areas is visible through at most a second amount of said fishline wound on said spool that is greater than the first amount, and
      both said first area and said second area of said display portion contrast visibly with the outer surface of said barrel portion.

10. A fishing reel according to claim 9, wherein said display portion is provided exclusively on the outer surface of said barrel portion.

11. A fishing reel according to claim 9, wherein said display portion is printed onto the outer surface of said barrel portion.

12. A fishing reel according to claim 9, wherein said display portion is painted onto the outer surface of said barrel portion.

13. A fishing reel according to claim 12, wherein said display portion has a coarse surface texture, such that a coefficient of friction for said display portion is greater than a coefficient of friction for the outer surface of said barrel portion.

14. A fishing reel according to claim 9, wherein:
   said spool further comprises a rear flange portion;
   said barrel portion extends axially from said front flange portion to said rear flange portion; and said display portion covers at least half of the outer surface of said barrel portion axially.

15. A fishing reel according to claim 9, wherein:

the outer surface of said barrel portion forms a circumferential periphery of said barrel portion; and said display portion covers at least a quarter of the outer surface of said barrel portion circumferentially.

16. A fishing reel according to claim 9, wherein:

said display portion exhibits at least three gradations of visibility in at least three respective areas of the display portion, wherein:

a third of said respective areas is visible through at most a third amount of said fishline wound on said spool that is greater than the second amount, and said third area of said display portion contrasts visibly with the outer surface of said barrel portion.

17. A fishing reel according to claim 9, wherein said first area and said second area each consist essentially of respectively different alpha-numeric symbols.

18. A fishing reel according to claim 9, wherein said first area and said second area each exhibit respectively different colors.

19. A method for estimating at least one of (i) an amount of fishline played out from a spool of a fishing reel and (ii) an amount of fishline remaining wound on a spool of the fishing reel, comprising:

providing a barrel portion of the spool of the fishing reel with a surface having a first visual characteristic;

applying a first pattern onto the surface of the barrel portion at a first location, wherein the first pattern has a second visual characteristic differing from the first characteristic;

applying a second pattern onto the surface of the barrel portion at a second location, wherein the second pattern has a third visual characteristic differing from the first characteristic and from the second characteristic;

providing the fishing reel with a fishing line that is at least translucent and with a mechanism for winding the fishing line around the surface of the barrel portion of the spool and playing out the fishing line from the spool; and establishing respective correlations between the first and second patterns and one of (i) the amount of fishline played out from the spool and (ii) the amount of fishline remaining wound on the spool, such that the first pattern corresponds to an amount of the fishline falling within a first range and such that the second pattern corresponds to an amount of the fishline falling within a second range;

whereby the second visual characteristic renders the first pattern discernable through the fishline wound on the spool only when the amount of the fishline falls within the first range; and whereby the third visual characteristic renders the second pattern discernable through the fishline wound on the spool only when the amount of the fishline falls within the second range.

20. A method according to claim 19, wherein:

the first pattern comprises numerals indicative of a first distance measurement;

the first range comprises distances less than the first distance measurement;

the second pattern comprises numerals indicative of a second distance measurement greater than the first distance measurement; and the second range comprises distances less than the second distance measurement.

* * * * *